Aug. 28, 1945.   C. E. SLAUGHTER   2,383,520
FABRICATION OF TUBING
Filed Sept. 11, 1942

INVENTOR.
Charles E. Slaughter
BY
Dean Laurence
ATTORNEY

Patented Aug. 28, 1945

2,383,520

UNITED STATES PATENT OFFICE 2,383,520

FABRICATION OF TUBING

Charles E. Slaughter, New Canaan, Conn., assignor to Extruded Plastics, Inc., Norwalk, Conn., a corporation of Connecticut Application September 11, 1942, Serial No. 458,051

16 Claims. (Cl. 18—57)

This invention relates to the art of fabricating tubing. It is more particularly concerned with a method of fabricating tubing from thermoplastic materials.

It is common practice to form tubing from thermoplastics by a continuous process usually termed "extrusion." The extrusion of tubing involves the feeding of a granular thermoplastic into one end of a hollow cylinder wherein it is heated to soften it. The cylinder is provided with a suitable internal screw member having flights thereon for positively conveying the material toward the opposite end of the cylinder. The heated material is expressed from the cylinder through a die member having an orifice which is ordinarily the precise shape of the tubing it is desired to produce. Fluid pressure is introduced into the tube through a crosshead to prevent the tubing from collapsing internally. It is fairly common practice to extrude the tubing downwardly into a cooling medium whereby it is chilled quickly to set it before it has a chance to deform materially.

This method is subject to the disadvantages of producing tubing which is out-of-round and of varying wall thickness. Another disadvantage of such method lies in the fact that it is almost impossible to produce tubing of any substantial size, e. g., three-eighths inch internal diameter or larger, which does not vary in cross-section along its length over a range as much as plus or minus twenty thousandths of an inch or more.

It is the principal object of this invention to provide a method whereby tubing of substantially uniform cross-section can be produced.

Another object of the invention is to provide a method whereby tubing of substantially uniform cross-section in a variety of shapes can be produced from a single extrusion die.

A further object of the invention is to provide a method whereby tubing of a predetermined cross-section can be produced at a relatively high rate.

Other objects will become apparent from the following description.

I have now found that the foregoing objects can be accomplished by expressing a heated thermoplastic through a die to form a tube while supporting the tube internally by introducing a fluid thereinto, in the usual manner, and thereafter drawing the so-formed tube, while it is still relatively plastic, successively through a plurality of draw plates or members spaced apart, each of said members having a similarly shaped opening slightly larger than the opening in the preceding member. Preferably, the tube is then drawn through a draw plate or member provided with an opening of the exact external shape desired in the finished tube, said member being disposed at other than a right angle to the line of draw.

The invention will best be understood with reference to the accompanying drawing, wherein.

Figure 1:
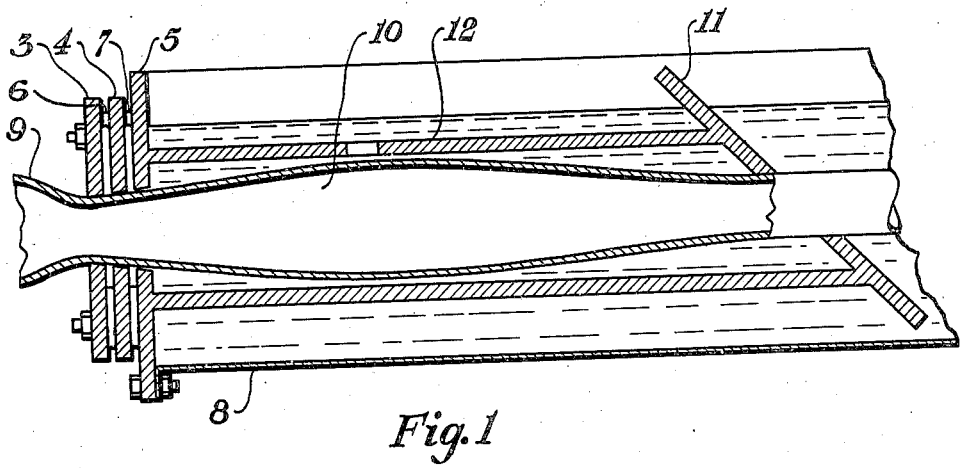
Figure 1 is a side sectional elevation illustrating suitable apparatus with which the invention can be practiced.

Before proceeding with a description of the drawing, it is thought the invention can best be explained by mentioning some of the principles which appear to determine the best method of practicing the invention. I have found that it is extremely important to contact at the same instant the entire periphery of the extruded tubing, while still very hot, with a coolant. If this is not done, the tubing shrinks more in one portion than in another and the strains set up therein cause it to become out-of-round. A second extremely critical feature of the invention is that the tubing must be given its final draw through a plate set at other than a right angle to the line of draw. The temperature of the tubing at the instant it is pulled through the final draw plate and the rate of travel of the tube are very important. The tubing must be hard enough to hold to shape as it emerges from the final draw plate but must be slightly plastic as it enters the plate so that it can be shaped therethrough. A third important feature in connection with the operation of the invention resides in the maintenance of a thin film of fluid coolant, whether in liquid or gaseous form, between the metal of each of the preliminary draw plates and the tubing drawn therethrough. The presence of such a film is provided for by the taper of the openings of the preliminary draw plates and precludes seizing such as would normally occur on contact between the plastic and the dry, hot metal of the draw plates. An exception to the foregoing is made with respect to the exact point of contact where the tubing enters the first draw plate and even here the possible existence of a cushioning film of gaseous coolant is appreciated.

Figure 2:
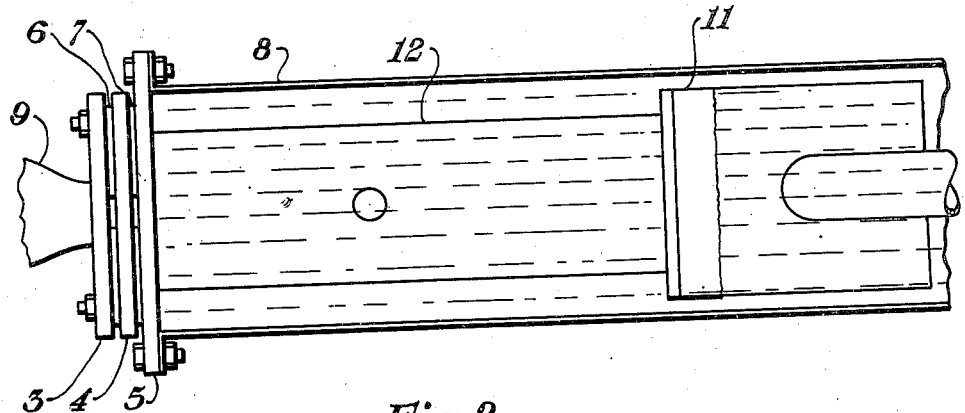
Figure 2 is a plan view of the apparatus shown in Figure 1.

Referring now to the drawing, the apparatus shown in Figures 1 and 2 consists essentially of a plurality of preliminary draw plates 3, 4 and 5. The plates are separated from each other by split spacing rings 6 and 7. The plate 5 forms the end of a trough 8 containing water ordinarily supplied at a temperature of about 55° F. Tubing 9 is expressed through the orifice of an extrusion die (not shown) and expanded somewhat by air forced thereinto in the cross-head holding the extrusion die. The expanded tubing 9 is drawn down and enters the opening in the first draw plate 3 and thereafter passes successively through similarly shaped openings in each of the succeeding draw plates 4 and 5.

The opening through the set of draw plates 3, 4, and 5, constitutes a frustum of a cone, the taper being preferably at an angle of about 5°. Thus, the tube 9 enters the opening in the preliminary draw plates at the point of least diameter of the frustum and effectively prevents cooling liquid from running out around the tubing through the opening in the first draw plate 3. At the same time, owing to the increasing diameter of the openings through the draw plates 3, 4, and 5, water flows from the trough around the tubing and a film of water is interposed between the tubing and the metal of the plates 4 and 5. Because the spacing rings 6 and 7 are split and open at the top and bottom, water flows through the opening in the rings 6 and 7 at the bottom thereof, which permits a steady flow of coolant to contact with the relatively hot plastic entering the draw plates.

Sufficient air may be introduced into the tubing 9 so that it is re-expanded somewhat after passing through preliminary draw plates 3, 4, and 5. This expanded tubing 10 is then drawn through an opening in the final draw plate 11, which opening is the exact size of the finished shape desired. The final draw plate 11 is set at other than a right angle to the line of draw of the tubing 9 in such manner that one side of the tubing 9 is no longer in contact with the draw plate 11 when the opposite side of the tube contacts the draw plate 11. It is convenient to support the draw plate 11 by a tubular member 12 joined to the draw plate 5. The said tubular member 12 is provided with an opening through which water or other cooling liquid may flow from the main supply thereof in the trough into said member 12 and thence into openings in the preliminary draw plates 3, 4, and 5. Suitable take-up means (not shown), for example, a large driven winding reel, are provided to pull the tubing through the shaping means hereinbefore described.

As a specific example illustrating the practice of the invention in apparatus of the type shown in the drawing, the fabrication of three-quarter inch outside diameter tubing with a one-sixteenth inch thick wall will be described. The tubing was made from Tenite II (a cellulose acetobutyrate plastic). This material was extruded at approximately 400° F. through an extrusion die with an annular orifice one inch in outside diameter and with a wall thickness of seventy thousandths of an inch. Sufficient air was introduced into the tubing to expand it to an outside diameter of about one and one-eighth inches. The tubing was pulled into a preliminary draw plate having a circular opening of eighty hundredths of an inch diameter at the point of entry of the tubing. Three preliminary draw plates were used, spaced apart twenty thousandths of an inch. The openings in the three plates were arranged in the line of draw and were gradually enlarged at an angle of 5° from the point of entry of the tubing into the first draw plate to the point of its exit through the three preliminary draw plates. The air pressure in the tubing was sufficient to enlarge it slightly after it emerged from the third draw plate and the enlarged tubing was then drawn through a plate set at an angle of 45° to the line of draw. The opening in this final draw plate was exactly three-quarters inch in diameter, in the line of draw. The tubing was extruded at a rate of fifty pounds per hour and was drawn through the final draw plate at a speed of fourteen feet per minute. In this manner, thousands of feet of tubing have been drawn which were not measurably out-of-round and which varied in diameter less than plus or minus three thousandths of an inch.

A preferred embodiment of the invention as herein described includes the use of a die of larger diameter than that of the finished tubing which expedites the maintenance of contact between the tubing and the first draw plate thereby preventing the escape of the coolant. This relationship of die diameter to tubing diameter is largely determined by wall thickness of the tubing under construction and is inversely proportional thereto. Thus the heavier the tubing wall, the smaller the die diameter in comparison to that of the first draw plate and conversely. For example, on very heavy wall tubing, e. g., that having three quarters of an inch outside diameter and one quarter of an inch diameter hole, a die as little as twenty thousandths of an inch larger in diameter than the first draw plate may be employed. With thinner walled tubing, the die may have a diameter much larger than that of the first draw plate. A contributing factor in the establishment of the above described proportionality of diameters is the difficulty encountered in compress-drawing heavy wall tubing as compared to thin wall tubing.

The invention is applicable to the fabrication of tubing from a wide variety of thermoplastics such as cellulose esters and ethers, polyvinyl esters and halides, certain polymeric vinylidene compounds and copolymers thereof with other polymerizable materials, polyamide resins, and, in general, all plastics which can be extruded and which can be hardened by chilling for a suitable period of time at a temperature below the extrusion temperature.

The temperature of the cooling liquid employed to set the plastic and the rate of draw of the tubing are inter-related functions which must be carefully adjusted to give proper results. Cooling liquids other than water may be employed, e. g., glycerine, hydrocarbon oils, et cetera, so long as the coolant is substantially nonreacting with the particular plastic being drawn. Although it is preferable to employ a liquid coolant, various gases inert to the plastic being fabricated can be employed, particularly where the tubing size is relatively small and the wall thickness is not too great.

As herein used, the term "tube" or "tubing" refers generically to hollow elongated articles of uniform cross-section and is not to be construed as restricted only to such articles of circular section. For example, hollow articles of square, triangular, or hexagonal cross-section can be formed readily according to the present invention. I have drawn square tubing three quarters of an inch on a side with a one-sixteenth inch wall of uniform cross-section from tubing extruded through a circular annular orifice. This is of great advantage since it eliminates the necessity for having a special extrusion die for each shape of tubing desired. Such dies are frequently expensive, especially those for the extrusion of plastics which require heating means therein.

The angle of taper of the opening through the preliminary draw plates has been mentioned hereinbefore as 5°. While this appears to be the optimum angle, according to the experiments which I have performed, the invention is not restricted thereto and other angles of taper may be used, for instance from about 2° to about 10°, depending upon the thickness of the draw plates, the thickness of the wall section of the tubing, the particular plastic being worked, the speed of drawing, et cetera. Likewise, the angle at which the final draw plate is set with respect to the line of draw may vary from that hereinbefore specifically mentioned. It is only necessary that the tubing be subjected to force on one side before being contacted with the draw plate on the opposite side. Depending upon the thickness of the plate and the size of tubing being drawn, this angle may be from about 10° to about 80°, preferably from 30° to 60°.

While the foregoing description provides for passing the tubing through a final draw plate provided with an opening of the exact external shape and diameter as that desired in the finished article, a leeway of up to five thousandths of an inch is permissible in the diameter of the opening of the final draw plate. Such difference can often be compensated for by control of temperature, rate of drawing, and other operating factors to obtain tubing within tolerance limits and satisfactory for most practical purposes.

I claim:

1. In a method for the fabrication of tubing, the steps which include: expressing a heated thermoplastic through a die to form a tube while supporting the tube internally by introducing a fluid thereinto; drawing said tube successively through a plurality of preliminary draw plates spaced apart, each of said plates having a similarly shaped opening slightly larger than the opening in the preceding plate, while said tube is still relatively plastic, and, thereafter drawing said tube through a final draw plate provided with an opening to give the exact external shape desired in the finished tube, the plane of said opening being at other than a right angle to the line of draw.

2. In a method of fabricating tubing, the steps which include: drawing extruded thermoplastic tubing while still relatively plastic through a plurality of preliminary draw plates spaced apart, each of said plates having an opening of similar shape and slightly larger than the opening in the preceding plate; flowing a liquid coolant countercurrent to the direction of draw through the opening in each of said plates, except that with which the tubing is first contacted, to surround completely said tubing with the coolant; and, thereafter drawing said tubing through a final draw plate provided with an opening to give the external shape desired in the finished tubing, the plane of said opening being at other than a right angle to the line of draw, and the said draw plate being substantially immersed in a cooling fluid.

3. In a method of fabricating tubing, the steps which include: drawing extruded thermoplastic tubing while still relatively plastic and internally supported by fluid pressure through a plurality of preliminary draw plates spaced apart, each of said plates having an opening of similar shape, the channel formed by the openings in the series of said plates being flared at an angle of about 5°; flowing a liquid coolant countercurrent to the direction of draw through the opening in each of said plates, except that with which the tubing is first contacted, to surround completely said tubing with the coolant; and, thereafter drawing said tubing through a final draw plate provided with an opening to give the external shape desired in the finished tubing, said plate being set at an angle of about 45° to the line of draw and being substantially immersed in a cooling fluid.

4. In a method for the fabrication of tubing, the steps which include: expressing a heated thermoplastic through a die to form a tube while supporting the tube internally by introducing a fluid thereinto, subjecting said tube while still in a plastic condition from the hot expression step to a preliminary drawing operation, and thereafter drawing said tube through a final draw plate provided with an opening of the exact external shape desired in the finished tube, the plane of said opening being at other than a right angle to the line of draw.

5. A method as set forth in claim 4, in which fluid coolant is maintained between the tube and the plates at any points where the tube and plates would contact in the absence of said coolant.

6. In a method for the fabrication of tubing, the steps which include: pressure extruding heated resinous thermoplastic tubing having a wall thickness that becomes self-sustaining when cooled, supporting said tubing internally by fluid under pressure, and drawing said tubing through a draw plate while still plastic from the extruding step to the desired cross-sectional shape while surrounding said tubing with liquid coolant between the tubing and draw plate during the drawing operation.

7. A method as set forth in claim 6, in which the tubing is given a final circular cross-sectional contour.

8. A method as set forth in claim 6, in which the tubing is given a final polygonal cross-sectional contour.

9. In a method for the fabrication of tubing, the steps which include: extruding thermoplastic tubing of annular cross-section, supporting said tubing internally by fluid pressure, and drawing said tubing while still relatively plastic through a draw plate at other than a right angle to the line of draw, said draw plate having an opening of the desired polygonal contour to polygonal cross-sectional contour.

10. In a method for the fabrication of tubing, the steps which include: extruding thermoplastic tubing having a wall thickness that becomes self-sustaining when cooled, supporting said tubing internally by fluid pressure, and drawing said tubing while still relatively plastic from the extrusion step to the desired cross-sectional shape through a final draw plate set at other than a right angle to the line of draw.

11. In apparatus for the fabrication of tubing by drawing operations from die extruded thermoplastic, in combination, a preliminary set of draw plates spaced apart having similarly shaped openings of increasing size, and a final draw plate having an opening to give the exact external shape desired in the finished tubing, the plane of the opening of the final draw plate being at other than a right angle to the line of draw.

12. Apparatus as set forth in claim 11, including means for maintaining liquid coolant between the tubing and the adjacent portions of the draw plates.

13. In apparatus for the fabrication of tubing by drawing operations from die extruded thermoplastic, in combination, a preliminary draw plate, and a final draw plate spaced therefrom, said final draw plate having an opening to give the exact external shape desired in the finished tubing, the plane of the opening of the final draw plate being at other than a right angle to the line of draw.

14. Apparatus as set forth in claim 13, including means for maintaining liquid coolant between the tubing and the adjacent portions of the draw plates.

15. In apparatus for the fabrication of tubing by drawing operations from die extruded thermoplastic, in combination, a preliminary draw plate, and final draw plate means spaced therefrom to give the tubing the final external shape desired, said final draw plate means including draw plate surfaces contacting the tubing in such manner that one point on the periphery of the tubing is no longer in contact with the final draw plate means when another point on the periphery of the tubing opposite the first mentioned point is in contact with the final draw plate means so that a line through the said points of contact of draw plate surfaces with the tubing is at an angle other than 90° to the line of draw.

16. In apparatus for the fabrication of tubing by drawing operations from die extruded thermoplastic, in combination, a preliminary draw plate, and final draw plate means spaced therefrom to give the tubing the final external shape desired, said final draw plate means including draw plate surfaces contacting the tubing in such manner that said final draw plate means is in contact with one point on the periphery of the tubing in advance of its contact with another point on the periphery of the tubing, both of said points lying in a plane at 90° to the tubing, so that a line through the said points of contact of draw plate surfaces with the tubing is at an angle other than 90° to the line of draw.

CHARLES E. SLAUGHTER.